(12) United States Patent
Skinner et al.

(10) Patent No.: US 6,551,212 B2
(45) Date of Patent: Apr. 22, 2003

(54) DECELERATOR SYSTEM FOR A WORK MACHINE

(75) Inventors: Thomas G. Skinner, Aurora, IL (US); Jeff A. Steinmann, Yorkville, IL (US)

(73) Assignee: Caterpillar Inc, Peoria, IL (US)

( * ) Notice: Subject to any disclaimer, the term of this patent is extended or adjusted under 35 U.S.C. 154(b) by 30 days.

(21) Appl. No.: 09/785,392

(22) Filed: Feb. 16, 2001

(65) Prior Publication Data

US 2002/0115530 A1 Aug. 22, 2002

(51) Int. Cl.[7] ............................................. B60K 41/26
(52) U.S. Cl. .......................... 477/73; 477/77; 477/83; 477/94; 477/203; 477/211; 192/220.1
(58) Field of Search ........................ 477/73, 77, 78, 477/83, 94, 95, 210, 211, 203, 204, 205; 192/3.58, 219, 220, 220.1, 221, 13 R

(56) References Cited

U.S. PATENT DOCUMENTS

| | | | | |
|---|---|---|---|---|
| 5,052,531 A | * | 10/1991 | Bota | ........................ 192/219.1 |
| 5,456,333 A | * | 10/1995 | Brandt et al. | ............... 192/3.58 |
| 5,583,768 A | * | 12/1996 | Hamajima et al. | ............ 477/83 |
| 6,162,146 A | | 12/2000 | Hoefling | |
| 6,213,916 B1 | * | 4/2001 | Ning et al. | .................. 477/174 |
| 6,269,295 B1 | * | 7/2001 | Gaugush et al. | .......... 192/220.1 |
| 6,283,891 B1 | * | 9/2001 | Wozniak et al. | ............... 477/94 |
| 6,287,237 B1 | * | 9/2001 | Graf et al. | ..................... 477/94 |
| 6,290,627 B1 | * | 9/2001 | Kusafuka et al. | ........... 477/210 |
| 6,334,835 B1 | * | 1/2002 | Tanaka et al. | .............. 477/205 |
| 6,352,146 B1 | * | 3/2002 | Eismann et al. | ........... 192/3.58 |

* cited by examiner

*Primary Examiner*—Saul Rodriguez
*Assistant Examiner*—Ha Ho
(74) *Attorney, Agent, or Firm*—Liza J Meyers

(57) ABSTRACT

A decelerator control system includes a first control member, a machine control device, an engine, at least one brake, and a transmission. The first control member is manually moveable and is adapted to produce a first operator control signal. The machine control device is adapted to receive the first operator control signal and responsively produce an engine control signal, a brake control signal, and a transmission control signal. The engine is adapted to receive the engine control signal and responsively control the speed of the engine. The brake is adapted to receive the brake control signal and responsively control an engagement of the brake. The transmission is adapted to receive the transmission control signal and responsively control an engagement of the transmission.

21 Claims, 3 Drawing Sheets

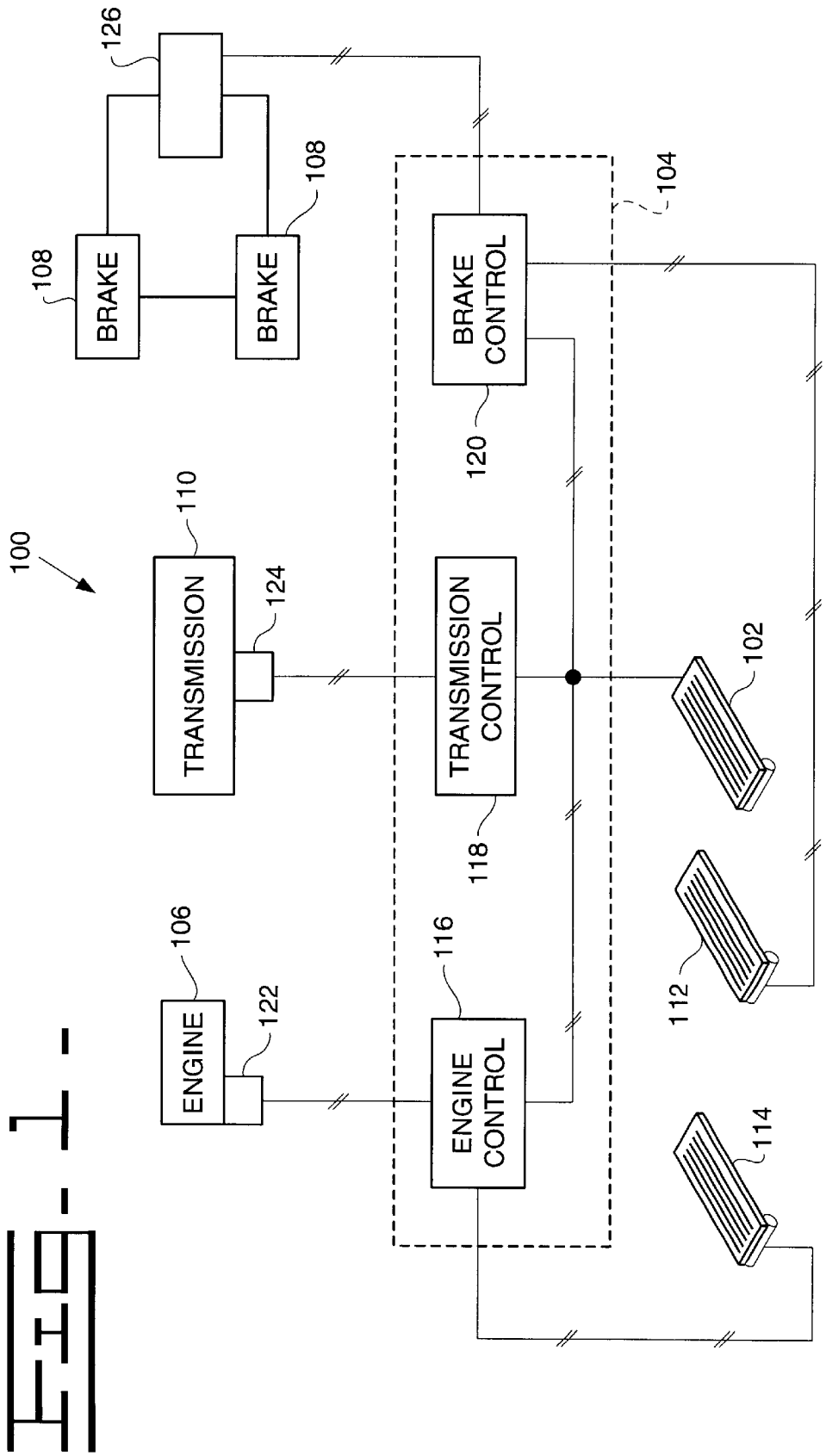

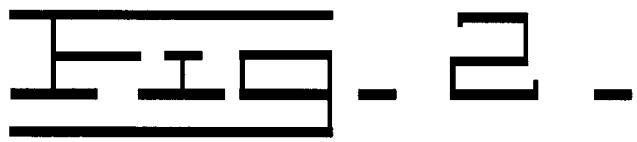
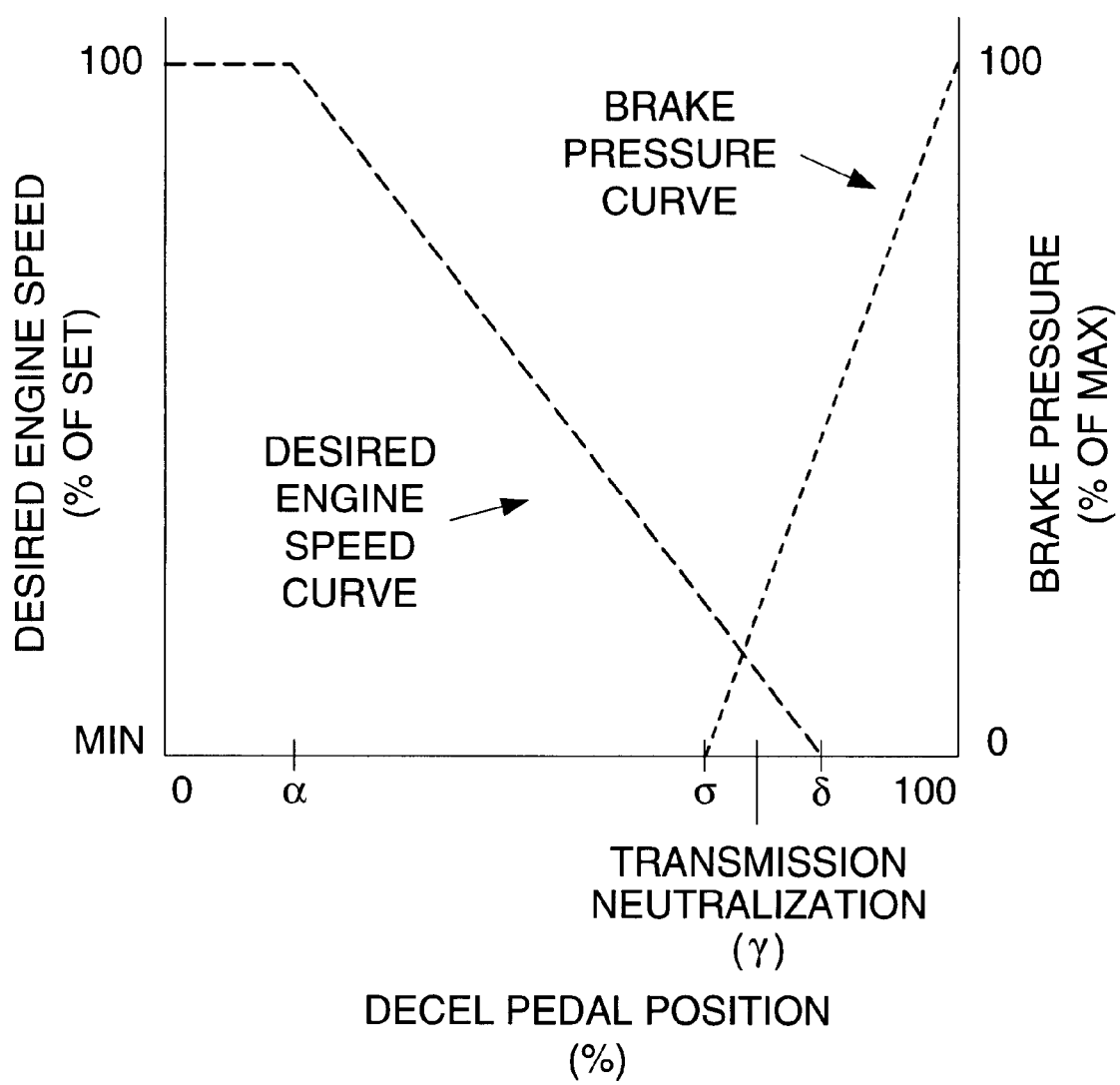

DECELERATOR SYSTEM FOR A WORK MACHINE

TECHNICAL FIELD

The present invention relates generally to a decelerator system for a work machine and, more particularly, to a decelerator system for a work machine incorporating an operator control device which allows the operator to control the engine, transmission, and brake with one command to decelerate the machine.

BACKGROUND ART

It is often desirable to control the drive train torque of a work machine while the work machine is digging or traveling. For example, in an earth-working type machine, an operator typically "inches" the machine when working with material while providing full power to the implement hydraulics to capture the material. It is important to control the amount of drive train torque to reduce rimpull, which is useful for reducing slipping.

In one conventional method of inching, the transmission is kept in gear and the brakes are manually modulated by use of a foot pedal. In another conventional method of inching, an impeller clutch is connected between a machine's engine and transmission. Typically, the impeller clutch is actuated through an operator pedal. The operator pedal acts to engage and disengage the impeller clutch, thereby varying the power transmitted by the drive train to slow the machine.

Most prior art methods of controlling the work machine to reduce drive train torque, reduce slipping, and prevent engine stalling are largely undesirable because they require considerable operator effort. Typically, three operator pedals are needed: one to control the engine acceleration, another to control clutch pressure, and yet another to control machine braking. Operators use all three of these pedals at various times in the work cycle, necessitating effort directed to activating pedals and changing foot positions.

An electrohydraulic control device for a drive train of a machine is disclosed in U.S. Pat. No. 6,162,146, issued Dec. 19, 2000 to Kenneth J. Hoefling (hereafter referenced as '146). A control member produces an operator control signal. An engine control module receives the operator control signal and responsively reduces the rotational speed of the engine. A transmission control module additionally receives the operator control signal and responsively controls the engagement of a predetermined transmission clutch to reduce the transmitted torque from the transmission. As shown in FIG. 3 of '146, the engine speed is at a maximum unless the operator manipulates the control member to reduce the engine speed and control the transmission and brake.

Accordingly, the art has sought a method and apparatus of a decelerator system for a work machine which: can be used either with a throttle lock or operator control of engine speed; has no impeller clutch and therefore does not generate clutch-related heat and wear on components; can neutralize the transmission; can be used with a traditional torque converter and transmission; may improve control of rimpull torque or ground speed on various footings; smoothes out directional shifts; requires less operator effort; facilitates greater operator comfort and confidence; may be used in a timely and efficient manner; and is more economical to manufacture and use.

The present invention is directed to overcoming one or more of the problems as set forth above.

DISCLOSURE OF THE INVENTION

In an embodiment of the present invention, a decelerator control system for a work machine is disclosed. The decelerator control system includes a first control member, a machine control device, an engine, at least one brake, and a transmission. The first control member is manually moveable and is adapted to produce a first operator control signal. The machine control device is adapted to receive the first operator control signal and responsively produce an engine control signal, a brake control signal, and a transmission control signal. The engine is adapted to receive the engine control signal and responsively control the speed of the engine. The brake is adapted to receive the brake control signal and responsively control an engagement of the brake. The transmission is adapted to receive the transmission control signal and responsively control an engagement of the transmission.

In an embodiment of the present invention, a method for controlling the deceleration of a work machine having an engine, a brake set, and a transmission is disclosed. The method includes the steps of reading the position of a first control device and responsively producing a first operator control signal; and reading the first operator control signal and responsively producing an engine control signal, a transmission control signal, and a brake control signal. The method also includes reading the engine, brake, and transmission control signals and responsively controlling the engine, brake, and transmission, respectively.

In an embodiment of the present invention, a method for use in a machine control system is disclosed. The method includes the steps of generating a control signal based on an operator input signal and including in the control signal values of a rate limited engine speed, a desired brake engagement, and a desired transmission engagement.

BRIEF DESCRIPTION OF THE DRAWINGS

For a better understanding of the invention, reference may be made to the accompanying drawings in which:

FIG. 1 is a block diagram of a preferred embodiment of the present invention;

FIG. 2 is a graph of a preferred embodiment of the present invention; and

BEST MODE FOR CARRYING OUT THE INVENTION

Figure 3:
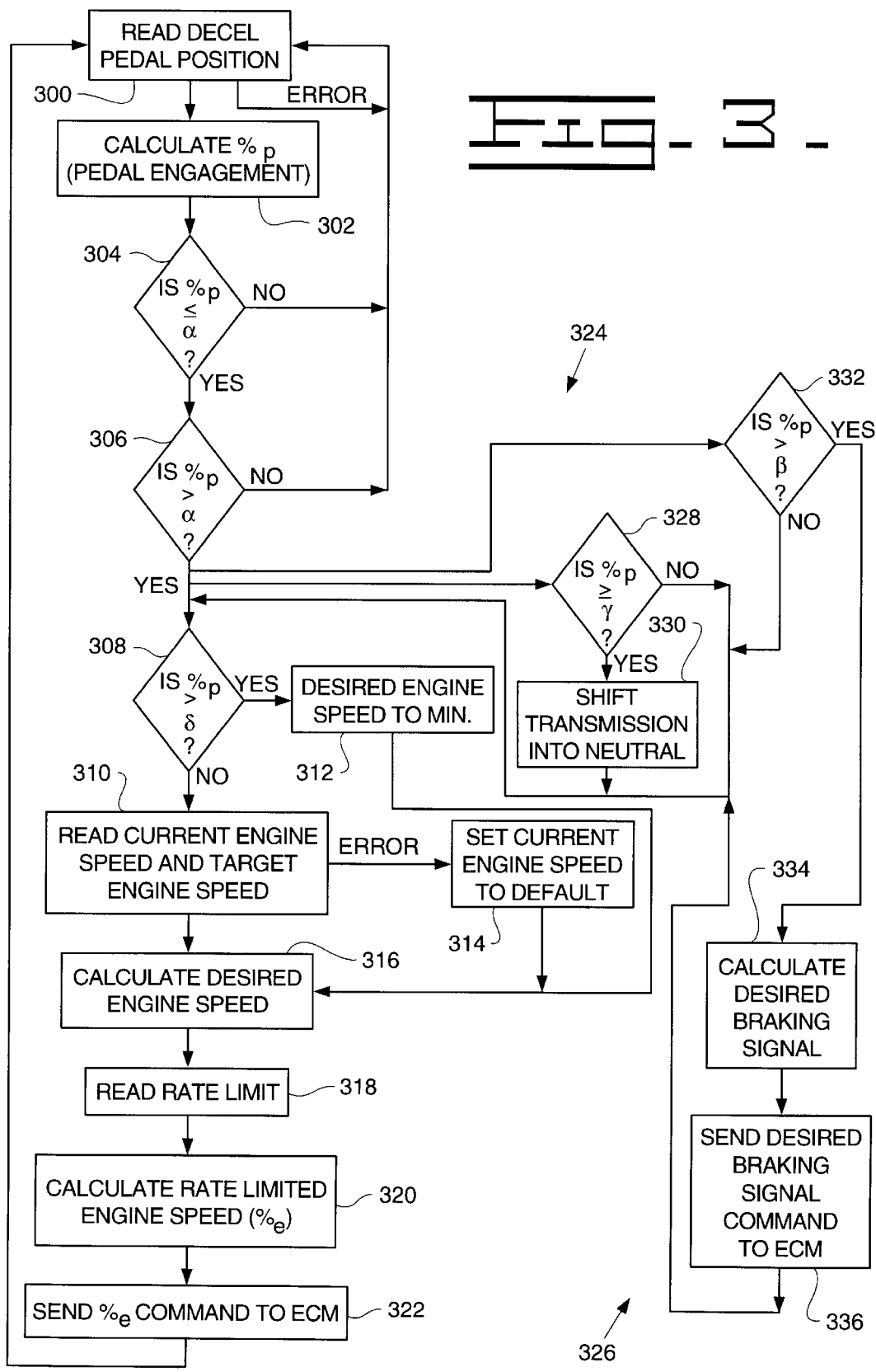
FIG. 3 is a flowchart of a preferred embodiment of the present invention.

An embodiment of the present invention provides an apparatus and method of a decelerator control system for a work machine. This invention may be applied to several types of work machines, including bulldozers, tractors, wheel loaders, and the like.

Referring to FIG. 1, a work machine (not shown) having a decelerator control system 100 is disclosed. The decelerator control system 100 includes a first control member 102, a machine control device 104, an engine 106, at least one brake 108, and a transmission 110.

The first control member 102 is manually moveable and adapted to produce a first operator control signal. The first control member 102 is a control device such as a switch, dial, paddle, or any other type of control device movable by an operator as is known in the art, but will be discussed herein as a foot pedal. A sensor (not shown) detects the position of the pedal and responsively produces an operator control signal or a pedal angle signal, which is then received by the machine control device 104. Preferably, the first control member 102 is depressible between first, second ($\alpha$), third ($\beta$), fourth ($\gamma$), fifth ($\delta$), and sixth positions, as shown in FIG. 2. These positions may be set in the system at the factory or be changeable in the field by the operator or a programmer. This first control member 102 is commonly referenced as a "decel" (for deceleration) pedal in the art, as well.

The decelerator control system 100 advantageously includes a second control member 112 adapted to produce a second operator control signal and a third control member 114 adapted to produce a third operator control signal. The second control member 112 and third control member 114 also can be any of the types of control devices known in the art, such as a switch, dial, paddle, or other device, but will be discussed as a foot pedal in this context.

The machine control device 104 is adapted to receive the first operator control signal and responsively produce an engine control signal, a brake control signal, and a transmission control signal. The machine control device 104 also is adapted to receive the second operator control signal and responsively produce the brake control signal and to receive the third operator control signal and responsively produce the engine control signal. The engine control signal, brake control signal, and transmission control signal may each be produced responsive to one or more operator control signals.

The engine 106 is adapted to receive the engine control signal and responsively control the speed of the engine. The brake 108 is adapted to receive the brake control signal and responsively control the engagement of the brake. The transmission 110 is adapted to receive the transmission control signal and responsively control the engagement of the transmission.

Advantageously, the machine control device 104 includes an engine control module 116, a transmission control module 118, and a brake control module 120. The engine control module 116 provides the engine control signal to at least one engine control device 122, e.g. an injector, which regulates the amount of fuel provided to the engine 106 to control the speed of the engine 106. The transmission control module 118 provides the transmission control signal to a transmission control device 124 to control the engagement of the transmission 110. The brake control module 120 provides the brake control signal to a brake control device 126, e.g. a brake valve, which regulates fluid flow to control the engagement of at least one brake 108.

Advantageously, the first control member 102 is linked mechanically, electrically, or electronically to the second control member 112 and movement of the first control member 102 causes the second control member 112 to responsively produce the second operator control signal.

The engine control device 122 may also be adapted to sense the speed of the engine 106 and responsively produce an engine speed signal. The machine control device 104 receives the engine speed signal and responsively produces the engine control signal.

Preferably and as shown in FIG. 2, the engine control signal is set to reduce the speed of the engine in response to the first control member 102 being between the second ($\alpha$) and fifth ($\delta$) positions. The brake control signal is set to increase the engagement of the brake 108 proportionally in response to the first control member 102 being between the third ($\beta$) and sixth positions. The transmission control signal is set to neutralize the transmission in response to the first control member 102 being at or beyond the fourth ($\gamma$) position. FIG. 2 shows several ranges of positions for the first control member 102, but proportions and/or order of the ranges need not be as shown for operation of the present invention; the ranges in FIG. 2 are given for example purposes.

Advantageously, the work machine (not shown) includes a throttle lock and the decelerator control system 100 operates independently from the throttle lock.

In a preferred embodiment, the machine control device 104 includes an electronic control module having a microprocessor computer chip. A specific program code can be readily and easily written from the flowchart, shown in FIG. 3, in the specific assembly language or microcode for the selected microprocessor. However, other suitable machine control devices are known in the art, any one of which could be readily and easily used in connection with an embodiment of the present invention.

The machine control device 104 is adapted to receive at least one of the engine speed signal and first, second, and third operator control signals and provide engine, brake, and transmission control signals in response to the engine speed signal and first, second, and third operator control signals. Preferably this machine control device 104 is one of many readily available computers capable of processing numerous instructions. It should be appreciated that the computer may include multiple processing units configured in a distributed structure environment and forming a system.

Advantageously, and not shown in the Figures, an operator input signal is generated. A control signal based on that operator input signal is generated. The control signal includes the value of one or more of: a rate limited engine speed, a desired brake engagement, a desired transmission engagement, and a machine component control value. The operator optionally generates the operator input signal by affecting a position of an operator input device. The values included in the control signal may be read and a machine component controlled responsively thereto.

In FIG. 3, the position of the first control member 102, or decel pedal, is read at first control block 300. If there is an error in reading the position, the program logic returns to first control block 300. If the position is successfully read, the percentage of engagement ($\%_p$) of the first control member 102 is calculated at second control block 302.

At first decision block 304, $\%_p$ is compared to $\alpha$. If $\%_p$ is less than or equal to $\alpha$, the program logic returns to first control block 300. If $\%_p$ is not less than or equal to $\alpha$, then $\%_p$ is compared to $\alpha$ at second decision block 306. If $\%_p$ is greater than $\alpha$ at second decision block 306, then $\%_p$ is compared to $\delta$ at third decision block 308, else the program logic returns to first control block 300. If $\%_p$ is greater than $\delta$ at third decision block 308, then the desired engine speed is set to a desired minimum engine speed at fourth control block 312 and the program logic skips ahead to sixth control block 316. If $\%_p$ is not greater than $\delta$ at third decision block 308, then the current engine speed (taken from the engine control device or other sensing source) and target engine speed (taken from the throttle lock, third control member 114, or other source) are read at third control block 310. If there is an error with reading the current engine speed or target engine speed, then the current engine speed is set to a predefined default value at fifth control block 314.

Whether there is a read error or not, the program logic then proceeds to sixth control block 316. At sixth control block 316, the desired engine speed is calculated, then the program logic proceeds to read the rate limit at seventh control block 318. Next, the rate limited engine speed ($\%_e$) is calculated at eighth control block 320 using the desired engine speed and rate limit values. At ninth control block 322, the $\%_e$ command is sent to the engine control module 116 or the electronic control module. The program logic then returns to first control block 300.

If $\%_p$ is greater than $\alpha$ at second decision block 306, then the program logic enters a transmission control loop, shown generally at 324, and a brake control loop, shown generally at 326. At fourth decision block 328, $\%_p$ is compared to $\gamma$. If $\%_p$ is greater than or equal to $\gamma$, then the transmission is shifted into neutral at tenth control block 330 and the program logic proceeds to third decision block 308, else no transmission control action is taken, and the program logic proceeds to third decision block 308. At fifth decision block 332, $\%_p$ is compared to $\beta$. If $\%_p$ is greater than $\beta$, then a desired braking signal is calculated at eleventh control block 334 and sent to the engine control module 116 or the electronic control module at twelfth control block 336, else no brake control action is taken, and the program logic proceeds to third decision block 308.

The logic of FIG. 3 is performed every control loop to help control the deceleration of the work machine (not shown). However, those skilled in the art know that the aspects and characteristics of the decelerator control system 100 could be determined at other frequencies depending on factors like the operator control signals, engine speed, transmission or brake engagement, or other factors without deviating from the invention as defined by the appended claims.

While aspects of the present invention have been particularly shown and described with reference to the preferred embodiment above, it will be understood by those skilled in the art that various additional embodiments may be contemplated without departing from the spirit and scope of the present invention. For example, the engine, brake, and transmission can be controlled directly by the machine control device 104, additional sensors can be used to provide input to the system from the various components, or the operator may be provided with additional autonomy over the decelerator control system. However, a device or method incorporating such an embodiment should be understood to fall within the scope of the present invention as determined based upon the claims below and any equivalents thereof.

Industrial Applicability

As discussed herein and shown in the accompanying drawings, the present invention controls the engine, brake, and transmission of a work machine. This allows the operator to "inch" the machine while reducing rimpull to reduce slipping of the machine and stalling of the engine. To this end, the decelerator control system, via a single operator pedal, controls the engine speed, transmission engagement, and brake engagement as defined by predetermined curves, shown in FIG. 2, in response to the pedal position.

An operator commonly uses the third control member 114 and/or a throttle lock device to manually control the engine speed by setting a desired speed of travel or a desired engine speed and modulating that speed downward through the use of the brake 108 and/or decelerator control system 100. The third control member 114 and/or throttle lock device may remain engaged during the operation of the decelerator control system 100. The operator may use the second control member 112 to manually operate the brake 108 to slow or stop the machine quickly, but should normally use the first control member 102 to avoid machine wear and wasted energy associated with frequent brake use. Thus, the machine may be operated as desired with the use of only one pedal during the work cycle.

An operator slowing a work machine down, either to inch while working with material or during machine travel, operates the first control member 102. For purposes of the present discussion, this operation will be characterized as the depression of a pedal. In a first region of pedal travel, the engine speed is decreased proportionally with the amount of pedal depression to slow the machine. If the pedal is further depressed into a second region of travel, the brake 108 is applied, again proportionally with the amount of pedal depression. At a predetermined point of pedal travel independent of the operation of the brake 108 and engine 106 control, the transmission 110 is neutralized. Thus the operator may control and modulate the speed of the machine and the driveline torque associated therewith by the use of a single operator control device.

The apparatus and methods of certain embodiments of the present invention, when compared with other methods and apparatus, may have the advantages of: being used either with a throttle lock or operator control of engine speed; having no impeller clutch to generate clutch-related heat and wear on components; neutralizing the transmission; being used with a traditional torque converter and transmission; improving control of rimpull torque or ground speed on various footings; smoothing out directional shifts; requiring less operator effort; facilitating greater operator comfort and confidence; being used in a timely and efficient manner; and being more economical to manufacture and use. Such advantages are particularly worthy of incorporating into the design, manufacture, and operation of work machines. In addition, the present invention may provide similar advantages that have not been discovered yet.

It should be understood that while a preferred embodiment is described in connection with a wheel loader, the present invention is readily adaptable to provide similar functions for other work machines. Other aspects, objects, and advantages of the present invention can be obtained from a study of the drawings, the disclosure, and the appended claims.

What is claimed is:

1. A decelerator control system for slowing a moving work machine, comprising:
    a first control member being manually moveable and adapted to produce a first operator control signal;
    a machine control device adapted to receive the first operator control signal and responsively produce an engine control signal, a brake control signal, and a transmission control signal;
    an engine adapted to receive the engine control signal and having an engine speed varying in response to the engine control signal;
    at least one brake adapted to receive the brake control signal and having an engagement varying in response to the brake control signal; and
    a transmission adapted to receive the transmission control signal and neutralize in response to the transmission control signal.

2. The system in claim 1, wherein a second control member is manually moveable and adapted to produce a second operator control signal, the machine control device adapted to receive the second operator control signal and responsively produce the brake control signal.

3. The system in claim 2, wherein the first control member is linked to the second control member and the first control member causes the second control member to responsively produce the second operator signal.

4. The system in claim 2, wherein a third control member is manually moveable and adapted to produce a third operator control signal, the machine control device adapted to receive the third operator control signal and responsively produce the engine control signal.

5. The system in claim 1, wherein the first control member includes a foot pedal being depressible between first, second, third, fourth, fifth, and sixth positions.

6. The system in claim 1, wherein an engine control device receives the engine control signal and responsively controls the engine, a brake control device receives the brake control signal and responsively controls the brake, and a transmission control device receives the transmission control signal and responsively controls the transmission.

7. The system in claim 6, wherein the engine control device controls the engine by regulating fuel provided to the engine, the brake control device controls the brake by regulating hydraulic fluid provided to the brake, and the transmission control device controls the transmission by regulating hydraulic fluid provided to the transmission.

8. The system in claim 6, wherein the engine control device is adapted to produce an engine speed signal and the machine control device is adapted to receive the engine speed signal and responsively produce the engine control signal.

9. The system in claim 5, wherein the engine control signal is set to reduce the speed of the engine proportional to the amount of depression of the foot pedal in response to the first control member being between the second and fifth positions.

10. The system in claim 5, wherein the brake control signal is set to increase the engagement of the brake proportional to the amount of depression of the foot pedal in response to the first control member being between the third and sixth positions.

11. The system in claim 5, wherein the transmission control signal is set to neutralize the transmission in response to the first control member being at the fourth position.

12. The system in claim 1, wherein the work machine includes a throttle lock and the decelerator control system operates independently from the throttle lock.

13. A method for controlling the deceleration of a moving work machine having an engine, a brake set, and a transmission, the method comprising the steps of:

producing a first operator control signal responsive to a position of a first control device;

producing an engine control signal, a transmission control signal, and a brake control signal responsive to the first operator control signal;

controlling the speed of the engine responsive to the engine control signal;

controlling the engagement of the brake set responsive to the brake control signal; and neutralizing the transmission responsive to the transmission control signal.

14. The method of claim 13, further comprising the steps of:

reducing a speed of the engine in response to the first operator control signal being in a first range;

neutralizing the transmission in response to the first operator control signal being in a second range; and engaging the brake set in response to the first operator control signal being in a third range.

15. An apparatus for controlling the travel speed of a work machine having an engine, a transmission, at least one brake, and an operator station, comprising:

a decel pedal adapted to produce a pedal angle signal;

an electronic control module adapted to receive the pedal angle signal and responsively produce an engine control signal, a brake control signal, and a transmission control signal;

an engine control module being adapted to receive the engine control signal, the engine control module decreasing the engine speed in response to the pedal angle signal being in a first range;

a brake control module being adapted to receive the brake control signal, the brake control module engaging the brake in response to the pedal angle signal being in a second range; and a transmission control module being adapted to receive the transmission control signal, the transmission control module neutralizing the transmission in response to the pedal angle signal being in a third range.

16. A method for controlling the travel speed of a moving work machine having an engine, at least one brake, a transmission, and an operator input device, the method comprising the steps of:

producing an input signal indicative of a position of the operator input device;

receiving the input signal and responsively producing an output signal;

receiving the output signal and responsively controlling the engine;

receiving the output signal and responsively-controlling the brake; and receiving the output signal and responsively neutralizing the transmission.

17. The method of claim 16, further comprising the steps of:

reducing a speed of the engine in response to the input signal being in a first range;

neutralizing the transmission in response to the input signal being in a second range; and engaging the brake in response to the input signal being in a third range.

18. The method of claim 17, further comprising the steps of:

producing a second input signal indicative of a position of a second operator input device;

receiving the second input signal and responsively producing a second output signal;

receiving the second output signal and responsively controlling the brake;

producing a third input signal indicative of a position of a third operator input device;

receiving the third input signal and responsively producing a third output signal; and receiving the third output signal and responsively controlling the engine.

19. A method for use in a machine control system, comprising the steps of:

generating a control signal based on an operator input signal;

including in the control signal a value of a rate limited engine speed;

including in the control signal a value of a desired brake engagement;

including in the control signal a value of a desired transmission neutralization; and reducing the velocity of a machine including the machine control system.

20. The method of claim 19, further comprising the step of:

generating the operator input signal responsive to the position of an operator input device.

21. The method of claim 19, further comprising the steps of:

reading the rate limited engine speed value and responsively controlling an engine;

reading the desired brake engagement value and responsively controlling a brake; and reading the desired transmission neutralization value and responsively neutralizing a transmission.

* * * * *